(No Model.)
H. R. SWINDLER, Jr.
TIRE.
No. 583,827. Patented June 1, 1897.
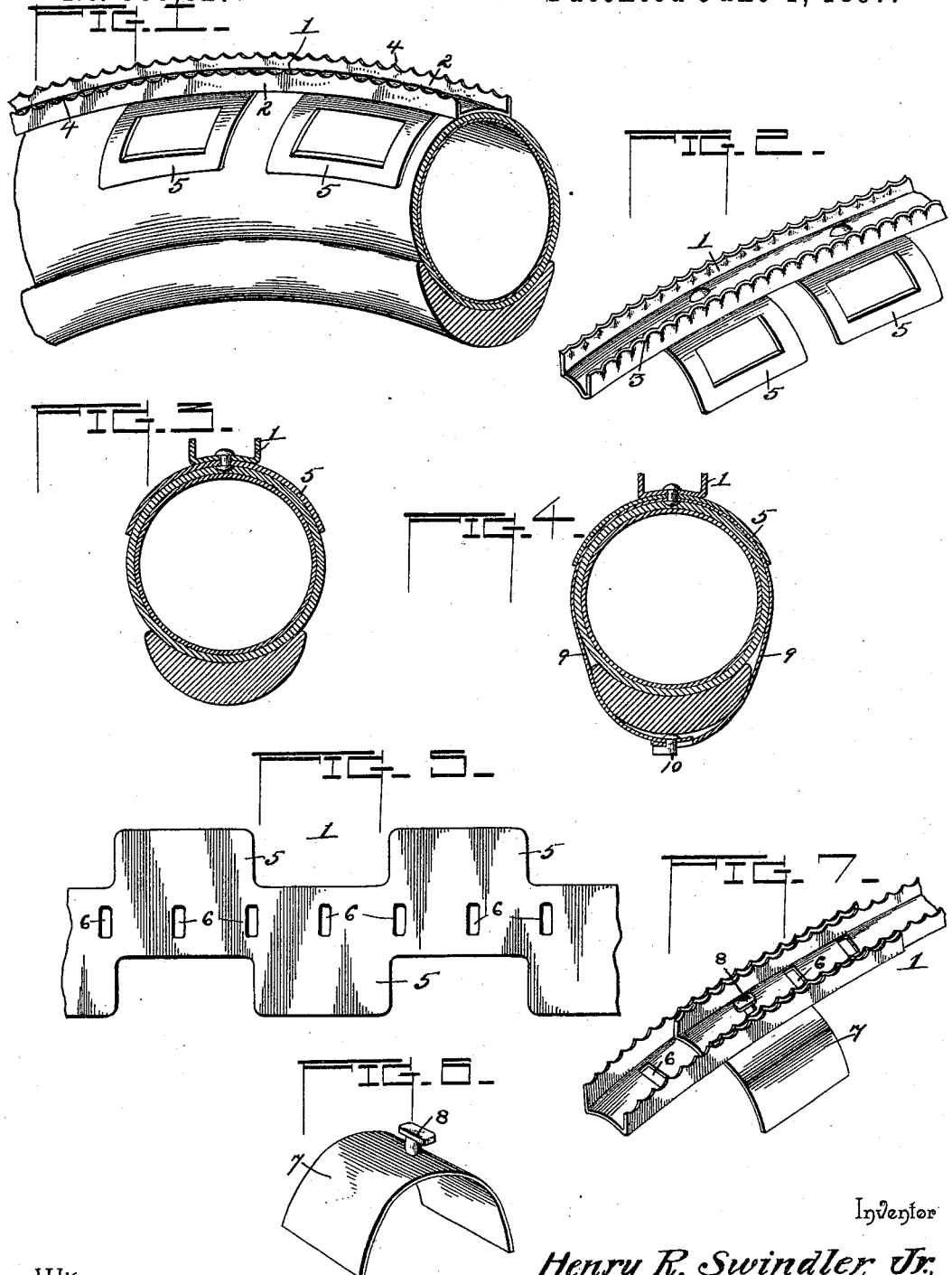
Witnesses
Milton O'Connell
R. M. Smith
Inventor
Henry R. Swindler, Jr.,
By his Attorneys,
C. A. Snow & Co.

UNITED STATES PATENT OFFICE.

HENRY R. SWINDLER, JR., OF MITCHELL, SOUTH DAKOTA.

TIRE.

SPECIFICATION forming part of Letters Patent No. 583,827, dated June 1, 1897.

Application filed December 26, 1895. Serial No. 573,409. (No model.)

*To all whom it may concern:*

Be it known that I, HENRY R. SWINDLER, Jr., residing at Mitchell, Davison county, South Dakota, have invented an Improvement in Winter King Ice-Tires, of which the following is a specification.

This invention relates to bicycle-tires; and the object in view is to provide an attachment for the tires of bicycles in the nature of a supplemental shoe or tire, which when properly applied will adapt the machine to be ridden with safety and speed upon ice.

The principal object of the present invention is to provide a supplemental shoe or ice-tread which may be instantly applied and removed and which is adjustable readily to wheels of different sizes and held in place thereon by the inflation of the pneumatic tire either with or without the aid of additional means.

The invention consists in certain novel features and details of construction and arrangement of parts, as hereinafter fully described, illustrated, and claimed.

In the accompanying drawings, Figure 1 is a perspective view of a portion of a wheel-rim and pneumatic tire, showing also the improved supplemental tire or ice-tread applied thereto, the latter being adapted for use on the rear or driving wheel. Fig. 2 is a detail perspective view of a portion of the ice-tread used upon the front or steering wheel. Fig. 3 is a cross-section through a rim and tire and the ice-tread, showing the manner of applying and securing the latter by inflation only. Fig. 4 is a similar view showing a strap employed as an additional means for securing the ice-tread. Fig. 5 is a plan view showing the tread-holder made in continuous form. Fig. 6 is a detail perspective view of the lock by which the lapped ends of the tread are fastened. Fig. 7 illustrates in detail perspective the method of locking the lapped ends of the tread.

Similar numerals of reference designate corresponding parts in the several figures of the drawings.

Referring to the accompanying drawings, 1 designates the improved supplemental tire or ice-tread, which for the sake of cheapness is made from sheet metal. This tread comprises a curved or concavo-convex middle or base portion, which corresponds in curvature to and snugly fits the tread-surface of the tire, and also opposing circumferential flanges formed, preferably, by bending the edges of the metal strip, of which the ice-tread is formed, outward in substantially parallel relation.

The ice-tread for each wheel is preferably made in one continuous piece, but the treads for the front and rear wheels differ in that the opposing circumferential flanges of the front-wheel tread are crimped on radial lines, as indicated at 3, to form laterally-projecting ridges or teeth for preventing lateral slipping of such wheel, while the flanges 2 of the rear-wheel tread have their edges notched or scalloped to establish points or teeth 4, which project radially and penetrate the ice sufficiently to obtain a firm hold thereon, thus enabling the driving-wheel to have considerable power applied thereto without danger of slipping circumferentially. Each of the treads is provided throughout its length with segmental holders 5, each formed separately and applied to the tread by riveting or otherwise, or the said holders, instead of being made separate, may be made in the continuous form illustrated in the plan view, Fig. 5, the essential point being that the said holder or holders shall embrace and conform in curvature to the cross-sectional shape of the tire, whereby the ice-tread is held in a medial line and prevented from moving to one side or twisting off the tire.

Each ice-tread is provided at or near its end portions with a series of transverse slots 6, any two of which may be brought into alinement by lapping the ends of the tread and sliding the same upon each other until the desired diameter of tread is attained. When so adjusted and after having brought two of the slots into alinement, a locking device is inserted through such slots for holding the ends together. This locking device comprises a segmental base portion 7, which also serves as a holder for the ice-tread, and a T-shaped stud 8, the head of which may be passed through the alining slots 6 and thereafter given a quarter-turn, so that the head of the stud is disposed longitudinally of the ice-tread and transversely of the slots 6. The T-headed stud is prevented from turning in such manner as to release the lapped ends of the tread by reason of the engagement beteen the base portion of said stud and the tire which it embraces. In this manner the tread 1 may be adjusted in diameter to suit different sizes of tires. The attachment thus far described is applied to the tire when the latter is deflated. Upon the inflation of the tire it presses outward firmly within the holder or holders 5, after which it will be impossible for the supplemental tire or ice-tread to become displaced.

In order to still further guard against the displacement of the ice-tread, flexible straps 9 of thin metal or other suitable material are attached to the holders 5, preferably by means of the same rivets which attach said holders to the tread. The ends of these bands pass around the wheel-rim, as indicated in Fig. 4, and one end of each strap carries a turn-button 10, while the opposing end of the strap is formed with a slot or aperture through which the turn-button may be passed and afterward turned for holding the ends securely together. This last-named feature may, however, be very well dispensed with, as the described attachment will be efficiently held in place by simply inflating the tire.

Changes in the form, proportion, and minor details of construction may be resorted to without departing from the spirit or sacrificing any of the advantages of this invention.

Having thus described the invention, what is claimed as new is—

1. A detachable ice-tread for tires, consisting of a strip of metal extending circumferentially around the tire and curved transversely to conform to the tire, the longitudinal edges of said strip being bent outward at right angles to the strip to form spaced rigid circumferential flanges, the same being crimped on radial lines to form laterally-projecting ridges or teeth, substantially as described.

2. A detachable ice-tread for tires, consisting of a metal strip extending circumferentially around the tire and having integrally-formed and alternately-arranged holders or lateral extensions, a second strip surrounding the first-named strip and comprising circumferential and spaced parallel flanges having their edges crimped, the said flanges being inflexible and rigidly connected to the strip proper, and means for adjustably connecting the meeting ends of said strips, substantially as described.

3. A detachable ice-tread for tires, comprising a metal strip extending circumferentially around the tire and having spaced parallel and inflexible flanges the edges of which are crimped, the meeting ends of said strip being overlapped and provided with a series of openings, and a curved metal-holder conforming to the cross-sectional shape of the tread surface of the tire and provided with a fixed T-shaped stud adapted to be inserted through registering openings in the meeting ends of the strip, the holder being engaged by the tire in such manner as to prevent said stud from becoming disengaged from the ends of the strips, substantially as described.

HENRY R. SWINDLER, JR.

In presence of—
FRANK D. POWERS,
D. C. BURNSIDE.